(No Model.)
O. A. BULETTE.
VEGETABLE CUTTER.
No. 590,129. Patented Sept. 14, 1897.
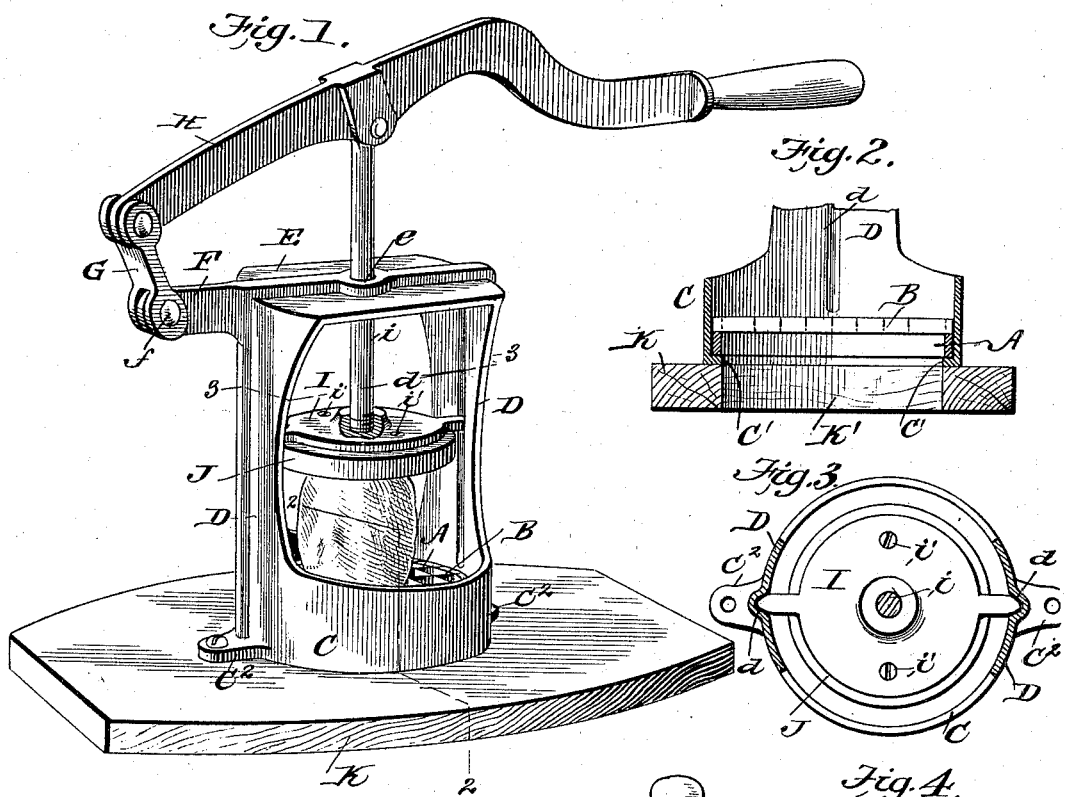
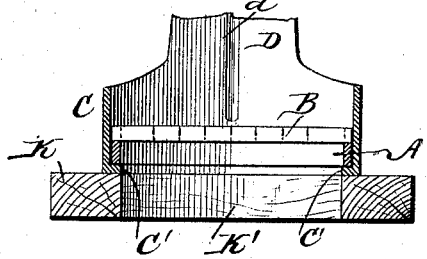
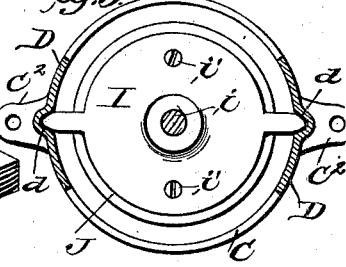
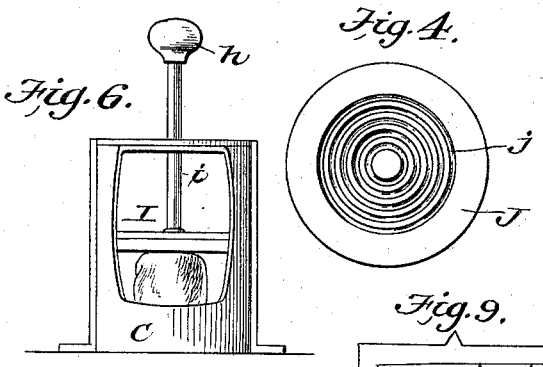
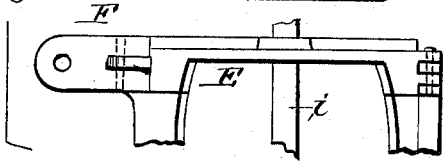
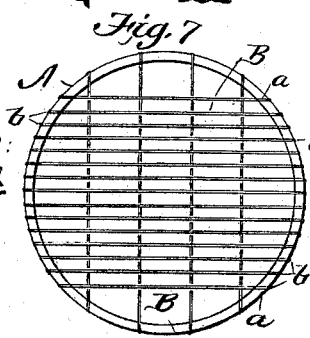
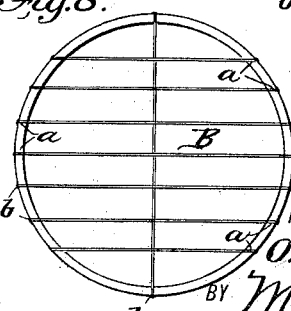
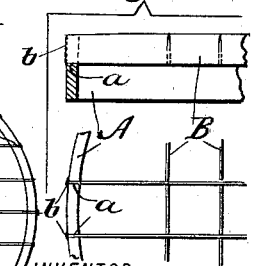
WITNESSES:
M. S. Blondel
P. B. Turpin
INVENTOR
O. A. Bulette.
BY Munn & Co.
ATTORNEYS.
THE NORRIS PETERS CO., PHOTO-LITHO., WASHINGTON, D. C.

United States Patent Office.

OSCAR A. BULETTE, OF CHICAGO, ILLINOIS.

VEGETABLE-CUTTER.

SPECIFICATION forming part of Letters Patent No. 590,129, dated September 14, 1897.

Application filed March 31, 1897. Serial No. 630,132. (No model.)

*To all whom it may concern:*

Be it known that I, OSCAR A. BULETTE, residing at Chicago, in the county of Cook and State of Illinois, have invented a new and useful Improvement in Vegetable-Cutters, of which the following is a specification.

My invention is an improvement in apparatus for cutting or slicing vegetables, fruit, and the like; and it consists in the method of making the cutters and in certain novel constructions and combinations of parts, as will be hereinafter described, and pointed out in the claims.

In the drawings, Figure 1 is a perspective view of my cutting apparatus. Figs. 2 and 3 are detail sections on, respectively, lines 2 2 and 3 3 of Fig. 1. Fig. 4 is a detail view of the follower-block. Figs. 5 and 6 show constructions varied somewhat from that shown in Fig. 1. Figs. 7 and 8 are detail views showing different shapes or designs of cutter, and Fig. 9 is a detail view of a part of one of the cutters.

The present invention relates particularly to and is an improvement in that class of cutters illustrated in my former patent, No. 563,652, dated July 7, 1896.

My cutter, as shown in the detail views, consists of a holder A, which is preferably made ring-shaped, as shown, and the blades B held within said holder. This is preferably effected by nicking the holder A at $a$ and fitting the ends of the blades B in said nicks and upsetting such blades at $b$ outside the ring, as best shown in Fig. 9.

It is desirable in practice to make the blades of the best knife-steel, and to tin, galvanize, or otherwise suitably coat the cutter with a protecting-plating in order to prevent injury thereto by the acids and like in the fruit or other material which may be cut by the device. In practice the cutter, after being tinned, is put in a tempering solution or bath, and it is found that if the ring A be made of steel or iron or other metal having approximately the same degree of expansion and contraction as the blades the contraction of the ring A, when the cutter is put in such tempering-bath, will be so great as to cause the blades to be compressed and bent or buckled out of shape, injuring, if it does not entirely destroy, the usefulness of the cutter. To avoid this objection and to render practicable the production of a cutter plated and tempered as desired, I make the cutter with the ring A of a metal varying in contraction and expansion from such properties in the blades and preferably effected by making the holder of a metal having a less degree of contraction than the blades to prevent the compressing and buckling of the latter, as before referred to. In practice I find it desirable to secure this result by making the ring A of brass and the blades of steel. I have found it practicable to employ for such purpose the commerical brass for sale on the market, making the rings A by cutting suitable sections from brass tubes of the desired diameter; but it will be understood that the metal for such rings A may be specially prepared from an alloy of copper, spelter, and tin, and where it is desired to decrease the contracting property the proportions of spelter and tin may be increased to any degree found necessary.

The galvanizing or tinning, in addition to forming a protection for the cutter, operates as a hard solder to firmly unite all the joints of the cutter.

The frame shown in Fig. 1 is preferably cast in one piece with a base-ring C, having an internal upwardly-facing shoulder C', the uprights D, having longitudinally-extending corrugations $d$, which form guides for the plungers and strengthening-ribs for the uprights, and the top E, having a central guide-opening $e$ for the plunger-rod and an extended bracket F, to which is pivoted at $f$ the link G, which connects with the lever H, which is jointed to the plunger-rod and serves to reciprocate the latter, as will be understood from Fig. 1. In Fig. 6 I show the plunger-rod as provided with a head $h$, and this construction may be employed when it is desired to omit the lever H.

The plunger I has a rod $i$ and is provided with a detachable follower-block J, which may be secured to the plunger I by screws $i'$. This follower-block is preferably of wood and is provided in its exposed face with grooves which cause it to hold the fruit or vegetable and prevent it from slipping. These grooves $j$ are preferably arranged, as shown in Fig. 4, in circular form and concentric with each other and with the said block J. This is preferred because it avoids any sharp projections from the face of the follower-block, which might injure the blades, and at the same time prevents any slipping of the fruit or vegetable as it is being forced downward by the plunger.

The holder A is in practice seated on the shoulder C' and may be quickly removed in order to cleanse the same or to insert any desired one of different designs of cutters, two different forms of which are shown in Figs. 7 and 8.

I provide the frame-ring C with lateral lugs $C^2$, which are bolted to a baseboard K, which is made sufficiently large to rest upon a bucket or other suitable vessel into which it is desired to discharge the sliced fruit or vegetable, such board having an opening K' registering with the opening in the base-ring C, as will be understood from Fig. 1.

While the top bar of the frame may be in one piece, as shown in Fig. 1, it may be desirable in some instances to make it in hinged sections, as shown in Fig. 5, wherein one section of the top is hinged at one end and suitably latched at its other end, so the plunger may be readily applied and removed without disconnecting any of the plunger parts.

Having thus described my invention, what I claim, and desire to secure by Letters Patent, is—

1. A cutter substantially as described comprising a holder and the blades within said holder and held at their ends thereto, said blades and holder being of unequal contractility whereby the blades will be tightened by said property within the holder substantially as described.

2. A cutter substantially as described comprising the holder, the blades within said holder and held at their ends thereto said holder and blades being coated with a protecting-plating and subsequently tempered, the holder and blades being formed of metals of unequal contractility when cooling whereby to prevent any buckling of the blades by reason of the tempering operation substantially as described.

3. The method of making cutters substantially as described consisting in securing the blades transversely in a ring-like holder of metal having a different degree of contraction under cold from said blades, coating said cutter with a protecting-plating and then tempering the cutter substantially as described.

4. The method of making cutters consisting in securing the blades at their ends in a ring-like holder of metal having a different degree of contraction under cold from the said blades and subsequently tempering the cutter, the cooling serving to tighten the blades in the holder substantially as described.

5. A cutter comprising the ring-shaped holder having nicks, the blades fitted at their ends in said nicks and upset whereby they are held to the holder, the holder and blades being of metal of different contractility whereby the blades will by said property be tightened within the holder substantially as described.

OSCAR A. BULETTE.

Witnesses:
PERRY B. TURPIN,
SOLON C. KEMON.